Oct. 25, 1932.  C. A. VON BLIX  1,884,413
FUEL HUMIDIFYING DEVICE
Filed Nov. 13, 1928
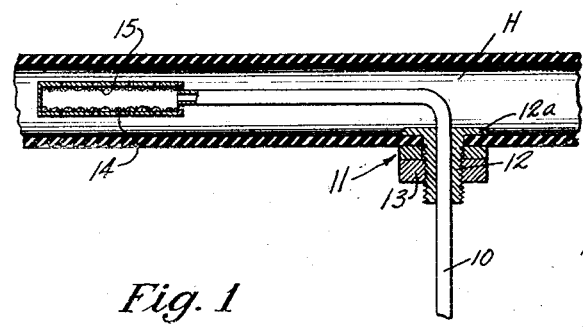
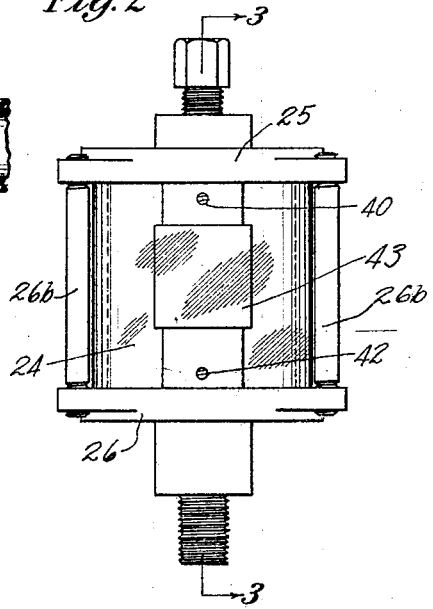
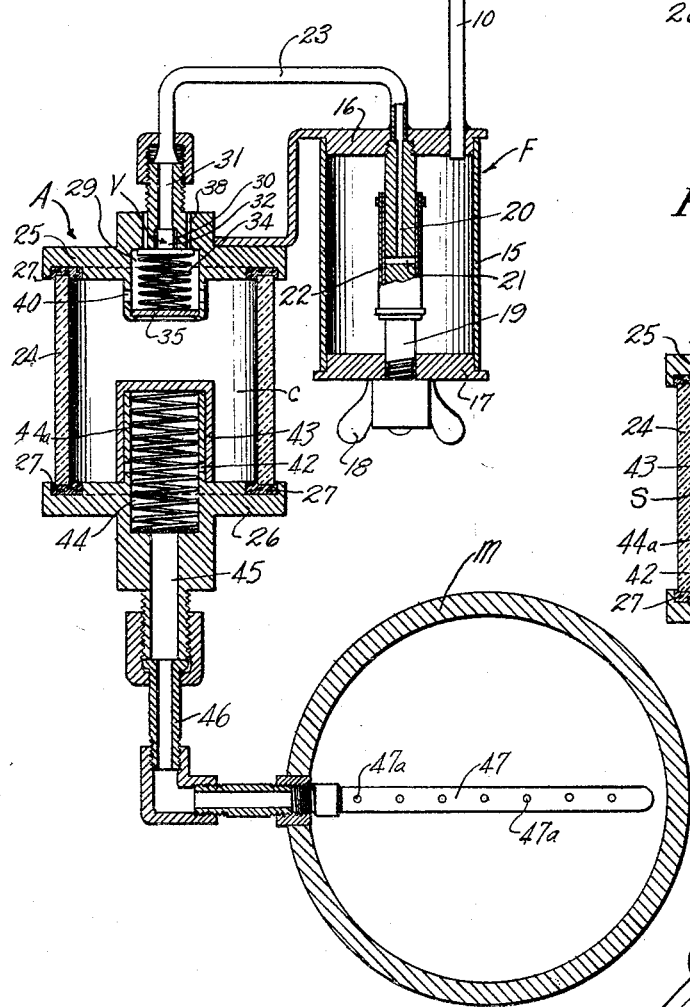
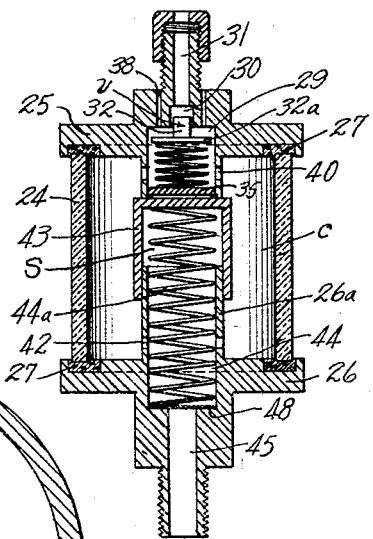
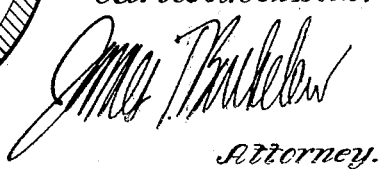
Inventor
Carlos A. Von Blix.
Attorney.

Patented Oct. 25, 1932

1,884,413

UNITED STATES PATENT OFFICE

CARLOS A. VON BLIX, OF GLENDALE, CALIFORNIA, ASSIGNOR TO IRVING A. FORD, OF GLENDALE, CALIFORNIA

FUEL HUMIDIFYING DEVICE

Application filed November 13, 1928. Serial No. 319,098.

The present invention has to do generally with humidifying devices, and relates more particularly to an apparatus for moistening the fuel and air mixture supplied to internal combustion engines.

It is commonly noted, especially in the operation of motor vehicles, that engine performance of increased efficiency is had in the vicinity of large bodies of water where the atmospheric humidity is comparatively high, and also at times when the atmosphere is humidified to the point of saturation, as during rainy weather. The reasons underlying the fact that superior engine performance is gained when the moisture content of the intake air is abnormally high need not be discussed herein, as it is generally established that this condition prevails.

It is the purpose of the invention, therefore, to provide a device of simple construction and operation whereby moisture may be added to the fuel mixture supplied to internal combustion engines during operation under normal atmospheric conditions of relatively low humidity, in order to duplicate substantially the conditions mentioned above, that is, to humidify the air and thereby bring about efficient engine performance. It has been found by use of the present device, an equipped engine is enabled to operate not only with increased efficiency but in addition, with materially decreased fuel consumption.

The above and numerous additional features of the invention will be most clearly and readily understood from the following detailed description of a typical embodiment thereof, reference being had throughout the description to the annexed drawing, in which:

Fig. 1 is an illustration of the device, with certain other parts, arranged for supplying air and moisture to the engine manifold, the various parts being shown in section;

Fig. 2 is an elevation of the humidifying device; and

Fig. 3 is a vertical section on line 3—3 of Fig. 2.

As illustrated in Fig. 1, a liquid supply line 10 is provided for delivering water from the usual hose connection H between the engine and radiator (not shown), to the humidifying device A, by way of a filter F, a mixture of air and finely divided moisture being formed in the humidifying device, as will later be explained, for delivery to the engine manifold M. Inasmuch as the invention is primarily concerned with the humidifying device, it will be understood, of course, that the illustrated method of connection to a suitable liquid supply and the use of the particular filtering means shown, are included merely as a typical suitable arrangement in which the humidifying device may be used.

Line 10 is inserted through the wall of hose H and is joined thereto by means of the fluid tight connection generally shown at 11, this connection comprising a threaded collar 12 fitted around the supply tube, the hose being confined between flange 12a of the collar and lock nut 13. A perforated filter tube 14 is joined to the supply line at its upper end, the filter tube containing a screen 15 for preventing the entrance of fine particles of dirt or rust with the liquid.

The filter F comprises a cylindrical barrel 15 confined between top and bottom closures 16 and 17. A stem 19, threaded into the top closure, extends through the barrel and bottom closure, and the parts are held in place by means of thumb screw 18 on the lower end of the stem. The stem is provided with a fluid passage 20 communicating with the interior of the filter through transverse bore 21, a suitable filter material 22 being wrapped around the stem to prevent dirt particles being taken into the passages. Thus liquid delivered to the filter through line 10 becomes freed of foreign particles, and clean liquid is then delivered to the humidifying device through line 23. The filter may readily be disassembled for cleaning simply by removing the thumb screw.

The humidifying device A embodies a cylindrical tube 24, preferably of glass, confined between the cover 25 and the base 26 by means of rods 26b, gaskets 27 being provided to prevent fluid leakage from the tubular chamber C. The cover is shaped to provide a liquid and air mixing compartment 29, this compartment communicating with line 23 by way of bores 30 and 31. At the upper end of compartment 29 is a valve generally indicated at V, the stem 32 of the valve extending within bore 30 and having sufficient clearance from the bore wall to permit liquid to be drawn into the mixing compartment from bore 31. The valve normally is held in its uppermost position, illustrated in Fig. 1, by means of a spring 34 confined between the circular head 32a of the valve and the bottom closure 35 of the mixing compartment. In its uppermost position the valve covers the lower end of air intake passages 38, thereby preventing both air and liquid from being drawn into the mixing compartment until the valve lowers from its seat. Communication is established between compartment 29 and chamber C by way of a plurality of openings 40 in the sides of the compartment.

The base 26 is shaped to provide a central tubular portion 26a extending upwardly within the chamber, the interior of said tubular portion communicating with chamber C by way of openings 42 near the bottom of the chamber. An inverted cup 43 is placed around the tubular portion 26a to have a sliding fit therewith, and is yieldably urged upwardly against the bottom of compartment 29 of the top closure by means of spring 44a confined between the upper end of the cup and the bottom of bore 44. The cup serves essentially, when actuated as will later be described as a slide valve for controlling the flow of liquid and air from chamber C into the engine manifold by way of ports 42, bores 44 and 45, line 46, and spray tube 47. As further insurance against the introduction of foreign particles to the engine, a screen 48 is placed in the bottom of bore 44a. The spray tube 47, containing apertures 47a, extends diametrically across the manifold in order to effect even distribution of moisture and air, by way of the apertures, throughout the fuel stream taken into the engine through the manifold.

During operation of the invention, assuming that it is desired first to supply moisture to the engine fuel during idling speed operation, the slide valve 43 assumes the position shown in Fig. 1 due to the fact that during idling speed, maximum depression occurs in the engine manifold, and this depression, being transmitted to line 46 to the enclosed space S between bore 44 and the slide valve, causes the latter to lower, compressing spring 44a, until port 42 becomes covered. It will be understood that by the term "depression" I refer to the pressure reduction below atmospheric pressure, created in this case by the engine suction. As the amount of depression in the manifold decreases during increasing engine speed, the air pressure in chamber C on top the slide valve becomes insufficient to counteract the thrust of spring 44, and the valve therefore raises causing port 42 to be uncovered. It is understood that while ports 42 are closed, the upper valve V is held against the top of the mixing compartment to prevent the flow of liquid and air into said compartment by way of bore 31 and passages 38 respectively.

Thus as the engine speed increases, the manifold depression simultaneously decreasing and permitting valve 43 to raise, said depression is transmitted through ports 42 to chamber C and thence through opening 40 into the mixing compartment. Due to the fact that the depression is communicated to the under face of valve V, and since the upper face of the head 32a is directly in communication with the atmosphere to passages 38, the valve becomes lowered against the resistance of spring 34 due to the flow of air into the chamber through said passages. Simultaneously with the lowering of the valve and the introduction of air, liquid from bore 31 is drawn into the compartment around valve stem 32 and becomes intimately mixed with the intake air. The liquid and air mixture then sprays into chamber C through opening 40, flows to the bottom of the chamber, from whence it is drawn by way of ports 42 into line 46 and thereafter discharged into the manifold through spray tube 47.

It will be noted that with spring 44a of given strength, ports 42 necessarily are restricted to such an extent that under conditions of maximum depression in the manifold, the pressure differential between space S and chamber C is sufficient to counteract the thrust of the spring until the manifold depression decreases to a point where the differential pressure no longer is sufficient to hold the sliding valve down. The parts are so proportioned that preferably, release of the sliding valve occurs at a point between idling and intermediate speed of the engine. Spring 34 being comparatively weak, the depression in chamber C is sufficient substantially at all times to permit the intake of liquid and air around the upper valve V.

In the operation of certain types of engines at extremely high speed, the manifold depression may again increase after previously decreasing during movement of the throttle valve to open position; and the increase in depression may be sufficient to cause the slide valve 43 to close. This is desirable in that at such high speed, undue heating of the engine valves due to excessive air supply may be prevented by limiting the air intake to that normally drawn through the carburetor, and cutting off the supply through the humidifying device.

It will be understood the drawing and description are to be considered merely as illustrative of and not restrictive on the broader claims appended hereto, for various changes in design, structure and arrangement may

I claim:

1. In a humidifying device of the character described, a closed chamber having an outlet through which depression is transmitted to the chamber, an inlet communicating with a water supply source and an air inlet for supplying moisture and air to said chamber, a single valve means for both said inlets adapted to permit moisture and air to be drawn into said chamber when the depression therein reaches a predetermined value, and valve means in said outlet.

2. In a humidifying device of the character described, a closed chamber having an outlet through which depression is transmitted to the chamber, an inlet communicating with a water supply source and an air inlet for supplying moisture and air to said chamber, valve means in the first mentioned inlet adapted to permit moisture to be drawn into said chamber when the depression therein reaches a predetermined value, means to produce an intimate mixture of air and water from said inlets to be introduced into said chamber, and valve means in said outlet adapted normally to permit the discharge of moisture laden air through said outlet and to prevent such discharge when the depression in the outlet reaches a predetermined value.

3. In a humidifying device of the character described, a closed chamber having an outlet through which depression is transmitted to the chamber, an inlet communicating with a water supply source and an air inlet for supplying moisture and air to said chamber, a single valve means for both said inlets adapted to permit moisture and air to be drawn into said chamber when the depression therein reaches a predetermined value, means to produce an intimate mixture of air and water from said inlets to be introduced into said chamber, and valve means in said outlet adapted normally to permit the discharge of moisture laden air through said outlet and to prevent such discharge when the depression in the outlet reaches a predetermined value.

4. In a humidifying device of the character described, a closed chamber having an outlet through which depression is transmitted to the chamber, a mixing compartment communicating with said chamber, an inlet communicating with a water supply source and an air inlet for supplying moisture and air to said compartment, valve means adapted to permit moisture and air to be drawn into said compartment when the depression therein is comparatively little, and valve means in said outlet adapted to prevent the discharge of moisture laden air when the depression in the outlet is comparatively great.

5. In a humidifying device of the character described, a closed chamber, an outlet through which depression is transmitted to the chamber extending through the bottom thereof, a mixing compartment in the top of said chamber and communicating therewith, a moisture inlet communicating with a water supply source and an air inlet for supplying liquid and air to said compartment, an inlet valve for controlling the flow of moisture and air through said inlets, yielding means holding said valve in closed position, a valve in said outlet for controlling the discharge of moisture laden air from said chamber, and yielding means adapted to hold the outlet valve in open position.

6. In a humidifying device of the character described, an outlet through which depression is transmitted to the chamber extending through the base thereof, said outlet communicating with a vertical tube integral with said base and extending upwardly within the chamber, a port through the wall of said tube near the bottom thereof, a vertically movable slide valve on the tube comprising an inverted cup placed thereupon and adapted in its lowermost closing position to close said port, yielding means urging said valve upward to an open position; a mixing compartment in the top of said chamber and communicating therewith, an inlet communicating with a water supply source and an air inlet for supplying moisture and air to said compartment, an inlet valve for controlling the flow of liquid and air through said inlets, and yielding means holding said valve in closed position.

7. In a humidifying device of the character described, a chamber, an outlet through which depression is transmitted to the chamber extending through the bottom thereof, an inlet communicating with a water supply source and an air inlet for supplying moisture and air to said chamber, an inlet valve for controlling the flow of moisture and air through said inlets, yielding means holding said valve in closed position and adapted to permit the valve to open at comparatively little depression in the chamber; a valve in said outlet for controlling the discharge of moisture and air mixture from said chamber, and yielding means adapted to hold the outlet valve in open position and to permit the outlet valve to close at comparatively great depression in said outlet.

In witness that I claim the foregoing I have hereunto subscribed my name this 12th day of October, 1928.

CARLOS A. VON BLIX.